(12) United States Patent
Tulchinsky et al.

(10) Patent No.: US 8,321,681 B2
(45) Date of Patent: Nov. 27, 2012

(54) MANAGING USER ACCOUNTS

(75) Inventors: Ilia Tulchinsky, Maple (CA); Wolfgang Haas, Kitchener (CA); Nathan Bullock, Kitchener (CA)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 12/838,712

(22) Filed: Jul. 19, 2010

(65) Prior Publication Data

US 2012/0017094 A1    Jan. 19, 2012

(51) Int. Cl.
*H04L 29/06* (2006.01)
(52) U.S. Cl. ........................................................ 713/182
(58) Field of Classification Search .................... 713/182
See application file for complete search history.

(56) References Cited

U.S. PATENT DOCUMENTS

| | | | |
|---|---|---|---|
| 7,099,933 B1 | 8/2006 | Wallace et al. | |
| 7,734,912 B2 * | 6/2010 | Ganesan et al. | 713/155 |
| 7,743,404 B1 | 6/2010 | Deutschmann et al. | |
| 7,814,536 B2 * | 10/2010 | Martherus et al. | 726/8 |
| 2005/0249255 A1 * | 11/2005 | Dwilinski et al. | 372/49.01 |
| 2006/0277596 A1 * | 12/2006 | Calvert et al. | 726/3 |
| 2008/0052775 A1 | 2/2008 | Sandhu et al. | |
| 2010/0017596 A1 | 1/2010 | Schertzinger | |

OTHER PUBLICATIONS

International Search Report and Written Opinion; PCT/US2011/044118; Feb. 10, 2012; 9 pages.

* cited by examiner

*Primary Examiner* — Michael S McNally
(74) *Attorney, Agent, or Firm* — Sughrue Mion, PLLC

(57) ABSTRACT

The present disclosure relates to managing user accounts in one or more computer systems. In general, one aspect of the subject matter described in this specification can be embodied in methods that include the actions of storing on a client computing device a first cookie containing plaintext representations of one or more user identifications, and a second cookie containing encrypted versions of the one or more user identifications; updating the cookies in coordination with each other based on communications received from a central server system in response to actions by a user of the client computing device to log on or off of accounts managed by the computer server system; and mediating user access to data stored locally on the client computing device by using the first and second cookies and determining whether the data is associated with one of the user identifiers.

18 Claims, 7 Drawing Sheets

| | 502 | 504 | 506 | 508 |
|---|---|---|---|---|
| | User action | Cookie state | Server actions | Client actions |
| 510 | Navigate to canonical application url (e.g. http://a.b.com ) | SID=MID="" | No partition in url or SID – redirect to login | After login user is redirected to http://a.b.com again |
| 512 | | SID=user1@b.com/encrypted | No partition in URL, identity in SID – redirect to url reflecting partition, set MID ( generate and store partition number if needed). | Redirect to partitioned URL: http://a.b.com/b/67/ |
| 514 | | SID=user1@b.com/encrypted MID=user1@b.com:67:0 | URL matches MID, SID, so serve application's resources, embedding user1. | Stores application resources in a cache and executes the application. |
| 516 | | Same | | MID matches URL and embedded identity – allow access to the cache for user1 |
| 518 | Bookmark the current URL | Same | | http://a.b.com/b/67/ is bookmarked. |
| 520 | Invoke "log in as another user" user interface | same | Redirect to online login (SID, MID are updated) | After login browser is redirected to a partitioned URL for the newly logged in user http://a.b.com/b/95/ |

FIG. 5A

| | 502 | 504 | 506 | 508 |
|---|---|---|---|---|
| 522 | | SID=user1@b.com, user2@b.com/encrypted MID=user1@b.com:67:0, user2@b.com:95:1 | | MID matches URL and embedded user2 – allow access to cache for user2 |
| 524 | Access bookmarked URL http://a.b.com/b/67/ | same | | MID matches URL – allow access to cache for user1 |
| 526 | Logout | SID=MID="" | | |
| 528 | Access bookmarked url. http://a.b.com/b/67/ | | | MID does not match the URL, so user is redirected to login |
| 530 | | SID=user1@b.com/encrypted MID=user1@b.com:67:0 | | MID matches URL – allow access to cache for user1 |
| 532 | Logout and log in as user3@b.com in a different browser page. | SID=user3@b.com/encrypted MID=user3@b.com:44:0 | | When another application attempts to access the cache for user1, SID will not match the URL and the user will be redirected to log in. |

FIG. 5B

MANAGING USER ACCOUNTS

BACKGROUND

The present disclosure relates to managing user accounts in one or more computer systems.

Computer users often have multiple user accounts with online service providers. For example, for an online email provider, some users have both personal and corporate email accounts. Those users typically have distinct user identifications and passwords for each account. A user who has multiple accounts generally either logs out of one account to access the other account, or logs in to both accounts at the same time. On a particular computer, or client device, a user may employ single sign on techniques so that entry of a password, such as during boot up, can be applied to multiple applications so that the user need not sign on multiple times.

Computer users generally access their online accounts from various client devices, e.g., a computer at home, a computer at work, a mobile device, and so on. To provide services to users on mobile devices, online service providers typically provide a mobile application, e.g., a mobile web application that executes within a web browser. Some mobile devices store the mobile web application in a cache. This is referred to as "appcaching." A user can run the application on those mobile devices without communicating with the online service provider (e.g., while offline, or to avoid cellular data charges).

SUMMARY

This document discusses techniques that may be used to establish controlled access to data and applications that may be available from online sources but may also need to be accessed when a user is not online, such as by using appcaching techniques. In certain implementations, the URL path for an application can reflect which of a user's identities is currently loaded (so that the path includes and encodes the identity), and such a path may be used to validate a cookie that is stored on a user's computing device. Such cookies may be stored as plain text, and separate encrypted cookies may be stored for use in validating online access to corresponding data (where the local data may be a temporarily cached version of the online data). Each of the cookies may contain a list of the identities for which a user is currently logged in (e.g., john@ex.com, john.smith@example.com). The identities in the cookies may be matched to each other, so that when a user logs off of online services, such an action is reflected in the encrypted cookie and the plaintext cookie, such as by removing the relevant identifier that corresponds to the account from which the user has logged off. In such a manner, the identifier will not be available as an access mechanism after the user has disconnected from a network (e.g., if the user is employing a web-based application in a remote area using a technology such as HTML5 or the like).

In general, one aspect of the subject matter described in this specification can be embodied in methods that include the actions of storing on a client computing device a first cookie containing plaintext representations of one or more user identifications, and a second cookie containing encrypted versions of the one or more user identifications; updating the cookies in coordination with each other based on communications received from a central server system in response to actions by a user of the client computing device to log on or off of accounts managed by the computer server system; and mediating user access to data stored locally on the client computing device by using the first and second cookies and determining whether the data is associated with one of the user identifiers. Other embodiments of this aspect include corresponding systems, apparatus, and computer program products.

These and other embodiments can optionally include one or more of the following features. The actions further include selecting an identifier for a first user identification from a plurality of possible identifiers; updating the first cookie with the identifier for the first user identification; and redirecting the client computing device to a resource locator including the identifier.

The actions further include identifying a previously determined identifier for a first user identification, where the previously determined identifier was selected from a plurality of possible identifiers; determining that the previously determined identifier matches another identifier of the one or more user identifiers; and selecting a new identifier for the first user identification from the possible identifiers, where the new identifier does not match any identifier of the one or more user identifications. The actions further include receiving a logout for a first user identification; and updating the first and second cookies to remove the user identification. The data is application code, and a first user identification is embedded in the application code.

The actions further include maintaining an index in the first cookie that specifies a mapping between user identifications in the first cookie and user identifications in the second cookie. The actions further include providing the data to the client computing device, including validating an identifier for a first user identification, wherein the identifier is included with a resource locator for the data, and wherein validating includes using the identifier and the first cookie to identify the first user identification in the encrypted cookie.

Particular embodiments can be implemented to realize one or more of the following advantages. A user on a client device can log in and out of multiple user accounts for an online service provider. The user can be logged in to several user accounts simultaneously. The user, while logged in to an account, can access account specific information stored on the client device without communicating with the online service provider. The user can set up convenient access to each account, e.g., using bookmarks.

A URL for an online service provider can be stable for a given user account, thus supporting bookmarking of that URL and appcaching (and thus fast application startup and offline access to the application). Moreover, the URL does not uniquely identify the user account, so privacy leaks can be prevented.

The details of one or more embodiments are set forth in the accompanying drawings and the description below. Other features, aspects, and advantages will become apparent from the description, the drawings, and the claims.

BRIEF DESCRIPTION OF THE DRAWINGS

FIGS. 5A and 5B show a table illustrating a series of example interactions between a user with multiple accounts on a client device and a server.

Like reference numbers and designations in the various drawings indicate like elements.

DETAILED DESCRIPTION

This description generally discusses techniques by which a user of a computing device may separately access data using a variety of account identifiers, such as their email address for work and for personal matters, and can do so on line and off line. In particular certain on line data may be cached on a device and may be accessed by the user if the systems described here indicate that the user was logged on with the particular identity when the user was last on line. Such access control may be exerted by maintaining matched cookies on the user's computer—one cookie in plain text and one cookie encrypted.

Figure 1A:
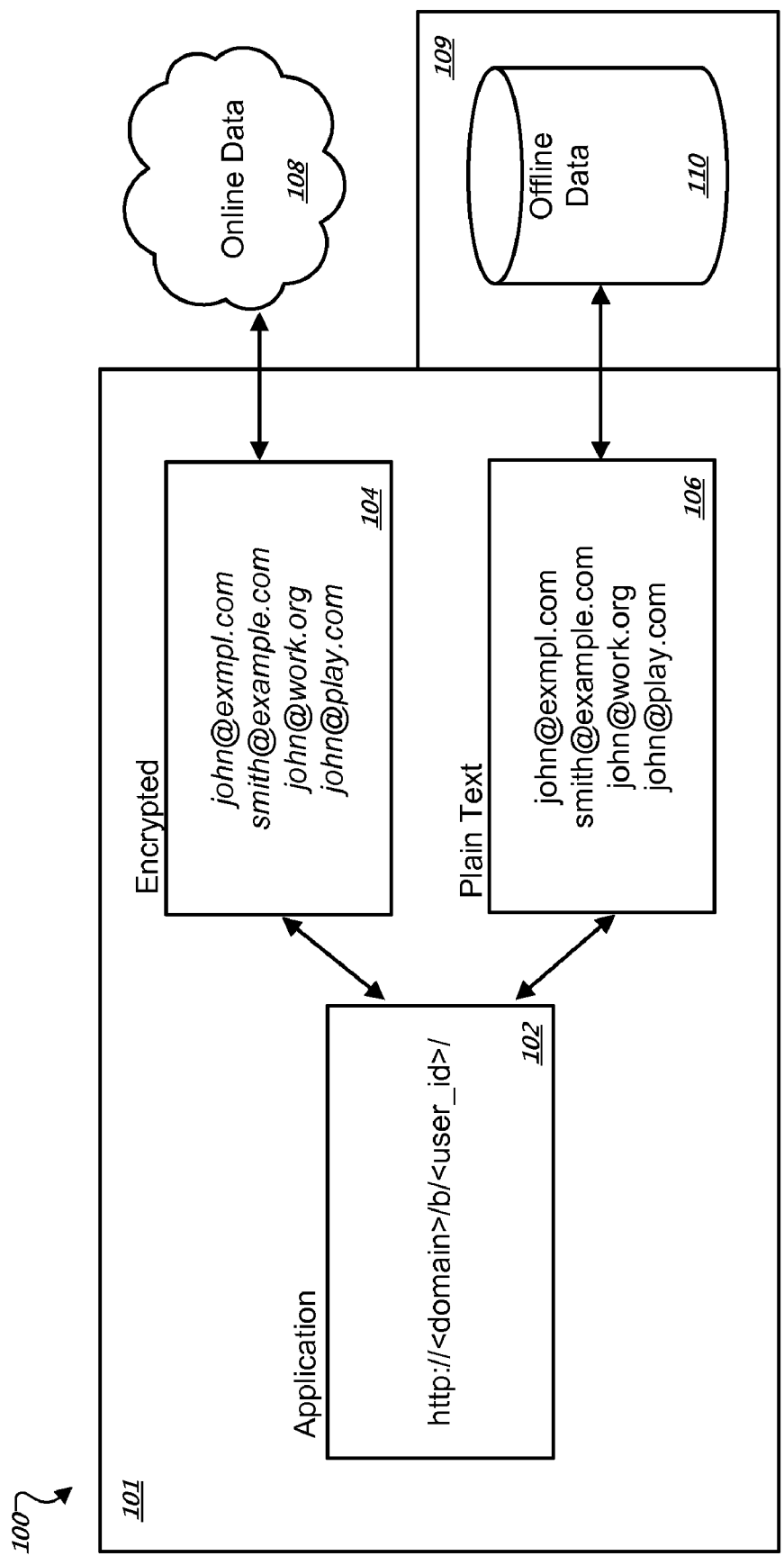
FIG. 1A is a conceptual diagram of a mechanism for allowing online and offline access to protected data for multiple user identities.

FIG. 1A is a conceptual diagram of a mechanism for allowing online and offline access to protected data for multiple user identities. In general, the system 100 is deployed in this example largely on a mobile computing device 101, such as a netbook, slate, or smartphone. The device 101 may permit a user to interact with a number of web-based applications that execute from within a web browser or by other mechanisms (e.g., as free-standing apps that access web-based data), and that depend on access to locally stored and network-stored data. The data may not be made readily available to the public, and thus may be made password protected in various familiar manners. For example, a user of the device 101 may be able to access the data only when the user has logged into an account that corresponds to the user and to the particular data. The user, of course, may maintain many such accounts, such as separate accounts for work and recreation purposes. As one example, the user may maintain two separate email addresses and may use each such address as an identifier to log into each respective account (along with a corresponding password that may be different for each account).

One or more applications such as application 102 may be installed to execute on the device 101. The application may be a web application that executes within a web application browser. In this instance, a URL is shown within the box representing the application 102, and the URL represents a path at which the application is called. Among other things, the path includes a user_id which may be the text of a user account identifier such as one of the email addresses for the user that are discussed above. The particular use of the URL, with the user_id encoded in the URL, is described in more detail below. In some implementations, instead of a user_id encoded in the URL, a user_partition is encoded in the URL to prevent privacy leaks.

The application 102 is enabled to access on line data 108 from a remote server system that is provided by an service provider, such as a provider of web-accessible data storage services, various services such as mapping and email, and other such services. The application 102 is also able to work offline and access offline data 110 that has been stored locally on a memory subsystem 109 of the device 101, such as a removable memory card. The general offline access may be provided by well-known techniques such as those implemented in the HTML5 standards.

In certain instances, the access to online and offline data may be restricted and may be correlated to certain particular identities of the user. The access may be controlled by using two different cookies stored on the device 101—an encrypted cookie 104 (where, for purposes of illustration, the identities are shown in italicized text to indicate that they are encrypted) and a plain text cookie 106. Each of these cookies may keep a list of the identities with which the user of the device 101 is currently logged in to data services, and the identities in the lists may be constantly coordinated.

The encrypted cookie may be used to access the on line data 108. The private key for the encryption may be unavailable to a user of the device 101, so that the contents of the key cannot be surreptitiously altered on the device. The encrypted cookie may instead be updated by the remote service when a user logs into and out of various accounts. The plain text cookie may be modified on the device, and may be used to determine whether a user operating under a particular identity should be allowed to access offline data 110, such as when the user is away from an internet connection.

The device 101 can verify the plain text cookie 106 against a user name encoded into application resources (e.g., embedded within JavaScript code for an application). The resources are typically stored in a cache (sometimes referred to as an appcache) from which the application is loaded. When the device 101 makes a network connection to a server for an online service provider, the server can verify the plain text cookie 106 against the encrypted cookie 104 to determine whether the plain text cookie matches the encrypted cookie.

As shown by the URL in the application, the application may be invoked by pointing to a path that encodes, within the path name, a particular identifier for the user of device 101. The identifier may relate to one of the identifiers stored in the cookies 104 and 106, and when it matches such identifiers for accounts to which the user is currently logged in, it will be used to determine which identifier is to be associated with the executing application, so that data for that identifier may be obtained and manipulated in the application automatically.

In this manner, the system 100 may provide for convenient and unobtrusive techniques of giving a user access to data that corresponds to an appropriate user account, from among multiple user accounts that may be active (e.g., logged in) simultaneously for the user. The access may be mediated so that the data for the right account is shown to the user, and secure, so that an unauthorized user cannot obtain access to stored data for the real user. Also, the access may be provided both when the user is on line and when the user is off line, and the data can be updated in an on line storage location when the user comes back on line after having been off line for a period.

Figure 1B:
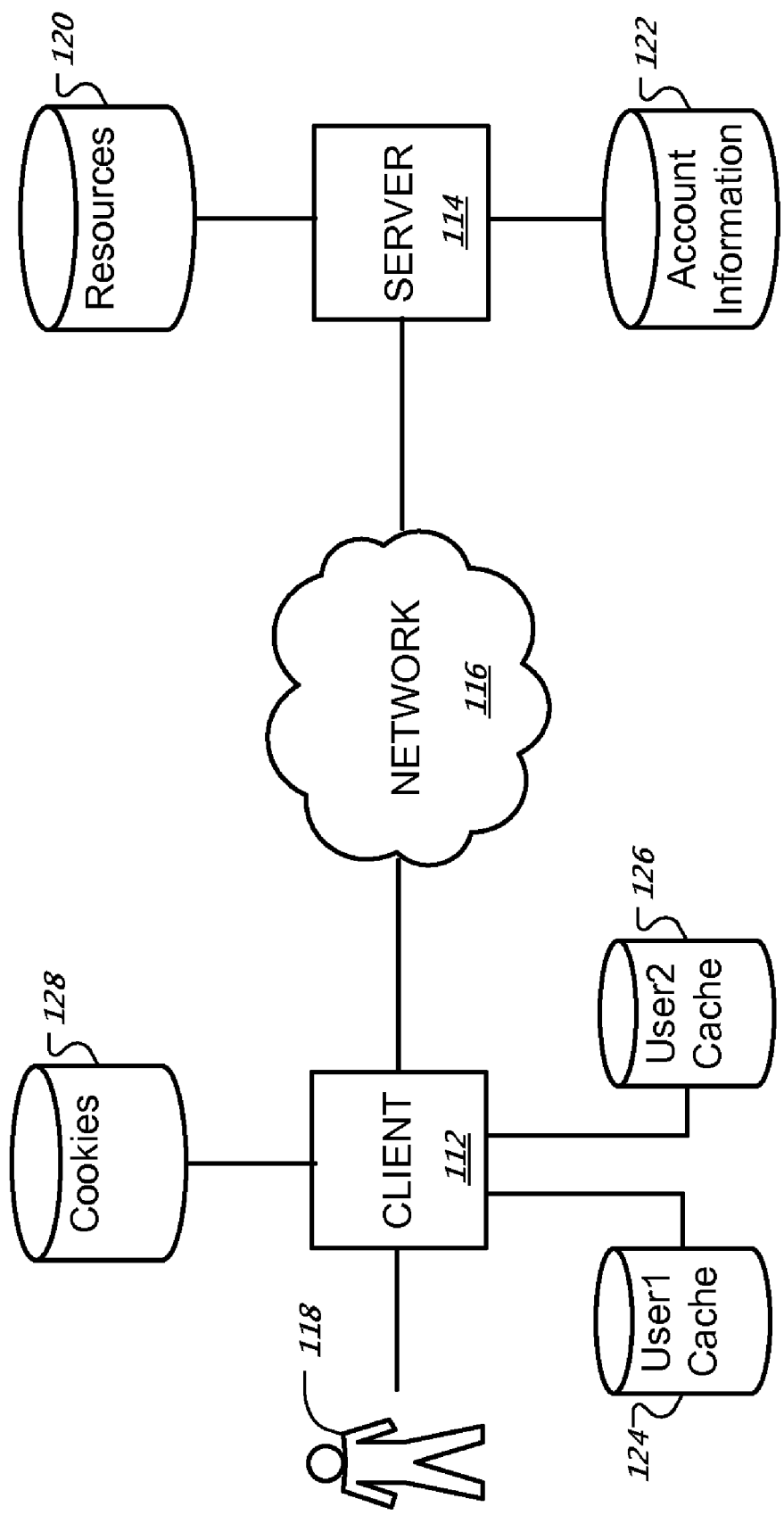
FIG. 1B is a block diagram showing an example client device configured to manage multiple user identities and access resources from an example server.

FIG. 1B is a block diagram showing an example client device 112 configured to manage multiple user identities and access resources from an example server 114. The client device 112 communicates with the server 114 using a network 116. In general, the client device 112 provides functionality similar to that described with respect to FIG. 1A, but a broader view of the other structural components with which the client device 112 interacts is shown here.

The server 114 includes one or more computers. The server 114 provides electronic resources 120 in connection with a service, for example, email, social networking, document editing, and so on. Examples of resources include hypertext markup language (HTML) pages, word processing documents, portable document format (PDF) documents, images, videos, and the like. Some resources include electronic content, e.g., text, pictures, and other media content. Some resources also include embedded information, e.g., meta (or metadata) information, hyperlinks, and embedded instructions (e.g., JavaScript scripts).

The server 114 stores account information 122 for user accounts. The account information 122 includes, for example, user identifications and user passwords. Some of the resources 120 are associated with particular user accounts. The server 114 verifies account information 122 before providing access to those resources. Such verification can occur by a variety of known techniques.

The client device 112 is an electronic device that is configured to request and receive resources over the network 116. Example client devices 112 include laptop computers, mobile communication devices (e.g., smart phones and personal digital assistants), and other devices that can send and receive data over the network 116. A client device 112 typically includes a user application, e.g., a web browser, to facilitate the sending and receiving of data over the network 116.

A user 118 can interact with the client device 112, such as by launching one or more applications, by interacting with objects provided by an operating system on the device 112, or in other appropriate manners. The user 118 in this example has multiple accounts with the server 114, including an account with the user identification "user1" (e.g., the user's corporate account) and an account with the user identification "user2" (e.g., the user's personal account). The client device 112 includes a cache 124 that stores resources associated with the "user1" account and a database 126 that stores resources associated with the "user2" account.

In some implementations, the caches 124 and 126 are HTML5 application caches. HTML5 application caches store, for example, JavaScript code for an application that is executable by a mobile web browser. When one of the caches 124 and 126 includes code for an application, the client device 112 can execute the application even when it cannot access the network 116.

The client device 112 stores cookies 128, including a plain text cookie and an encrypted cookie. A cookie, or browser cookie, is a piece of alphanumeric data that a server, such as the server 114, provides to a client device such as the client device 112, in a file that the server can later locate, so as to permit various operations during the use of a browser and between sessions on a browser. An HTTP cookie includes text stored by a web browser that typically includes name-value pairs of information used by a server in connection with providing a service.

In some implementations, the plain text cookie includes a list of identities that are currently logged in with the server 114. So, if the user 118 is logged in as both "user1" and "user2," the plain text cookie includes both of those user identifications. The server 114 sets those user identifications in the plain text cookie when it verifies those user identifications with the account information 122. The client device 112 grants access to resources in a cache when the plain text cookie includes the user identification associated with the cache.

The encrypted cookie is encrypted by the server 114. The server 114 retains the information necessary to decrypt the encrypted cookie (e.g., a private key). In some implementations, the encrypted cookie includes a list of identities that are currently logged in with the server 114. The server 114 sets those user identifications in the encrypted cookie when it verifies those user identifications with the account information 122. The server 114 grants access to resources 120 when the encrypted cookie includes the user identification associated with those resources.

Although FIG. 1 shows only one user 118, the client device 112 can support multiple users with multiple accounts. In such a situation, the user identifications are stored in a common set of cookies. Furthermore, the server 112 can support multiple client devices. In some implementations, a verification server verifies account information 122 and sets the encrypted and plain text cookies on client devices, and a data server uses the encrypted cookies to provide resources in connection with a service.

Figure 2:
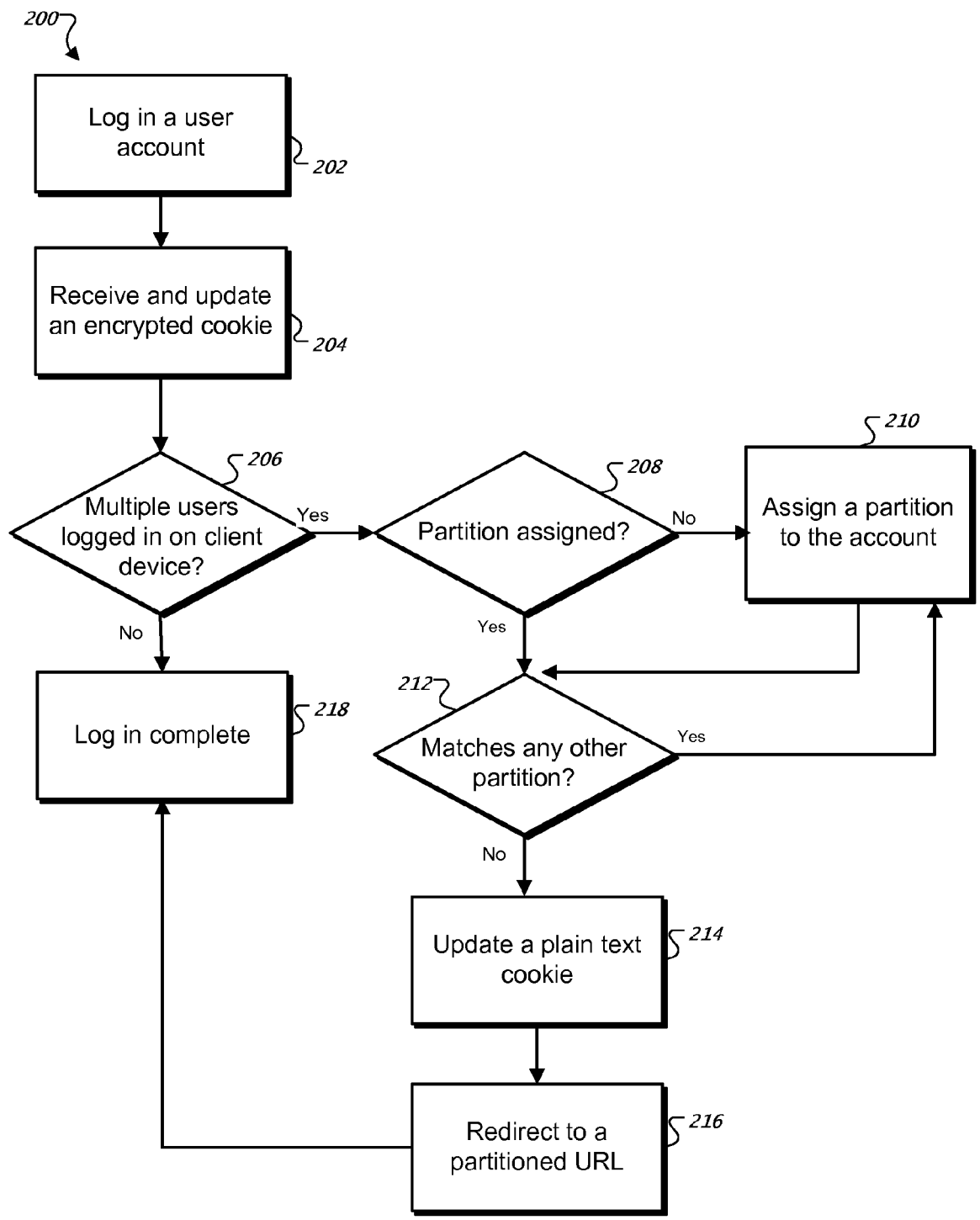
FIG. 2 is a flow diagram of an example process for logging in a user to an online service provider.

FIG. 2 is a flow diagram of an example process 200 for logging in a user to an online service provider. In general, the process involves storing a user identification in a plain text cookie and an encrypted cookie on a client system. In some implementations, the process 200 is performed by a system, e.g., the server 114 of FIG. 1. For purposes of illustration, the process 200 will be described with respect to a server that performs the process 200.

The server logs in a user account (step 202). The server receives a user identification and a user password for the user account from a client device and verifies the user identification with the user password. The server uses account information (e.g., account information 122) to verify the user identification with the user password. After logging in the user on the user account, the system receives a request for a resource from the client device. The resource is identified by a canonical uniform resource locator (URL). An example of a canonical URL for an application is http://<domain>/<applicationpath>.

The server then requests and receives an encrypted cookie from the client device (step 204). The encrypted cookie includes user identifications for user accounts that are logged in to the server. The encrypted cookie is encrypted by the server so that the client device cannot access the encrypted cookie without access to the server (or without breaking the encryption). The server updates the encrypted cookie on the client device to include the newly logged in user identification.

In some implementations, the server determines whether multiple users are logged in and assigns the user identification a partition number (steps 208-212) if there are multiple users logged in on the client device (step 206). The server determines the number of users logged in using the encrypted cookie. If there is only a single user logged in on the client device, log in is complete (step 218). In some other implementations, the server assigns the user identification a partition number (steps 208-212) regardless of whether there are multiple users logged in on the client device.

The server determines whether a partition number is already assigned to the user account for the user identification (step 208). The server uses account information (e.g., account information 122) to determine whether a partition number is assigned. A partition number is an identifier for the user account selected from a number of possible identifiers. In some implementations, the partition number is a number from between 0 and 99.

If a partition number has not already been assigned, the server assigns a partition number to the user account for the user identification (step 210). In some implementations, the server randomly (e.g., using a pseudo-random number generator) selects a partition number. In some implementations, the server determines what partition numbers are assigned to other user accounts logged in on the client device and selects a partition number that is not already in use on the client device. The server stores the partition number in account information (e.g., account information 122) for the user account for the user identification.

If a partition number is already assigned, the server determines whether the assigned partition number matches any of the partition numbers assigned to other user accounts logged in on the client device (step 212). In some implementations, the server performs this step after assigning a partition number in step 210. If the assigned partition number matches any of the partition numbers assigned to other user accounts, the server assigns a new partition number to the user account for the user identification (step 210).

With the necessary determinations above made, the server updates a plain text cookie on the client device (step 214). The plain text cookie includes user identifications for user accounts that are logged in to the server on the client device. The plain text cookie also includes the partition number for each user identification. In some implementations, the plain text cookie includes an index to the encrypted cookie for each user identification. An example index is a number that specifies which user identification in the encrypted cookie corresponds to the user identification in the plain text cookie.

The server then redirects the client device to a partitioned URL (step 216). A partitioned URL is a URL that includes the partition number assigned to the user account. An example of a partitioned URL is http://<domain>/<applicationpath>/b/<partition number>/. The log in is then complete for this example process (step 218).

By this method then, a user can be logged in to an online service provider. Multiple user identifications on a mobile device can be logged in using the method.

Figure 3:
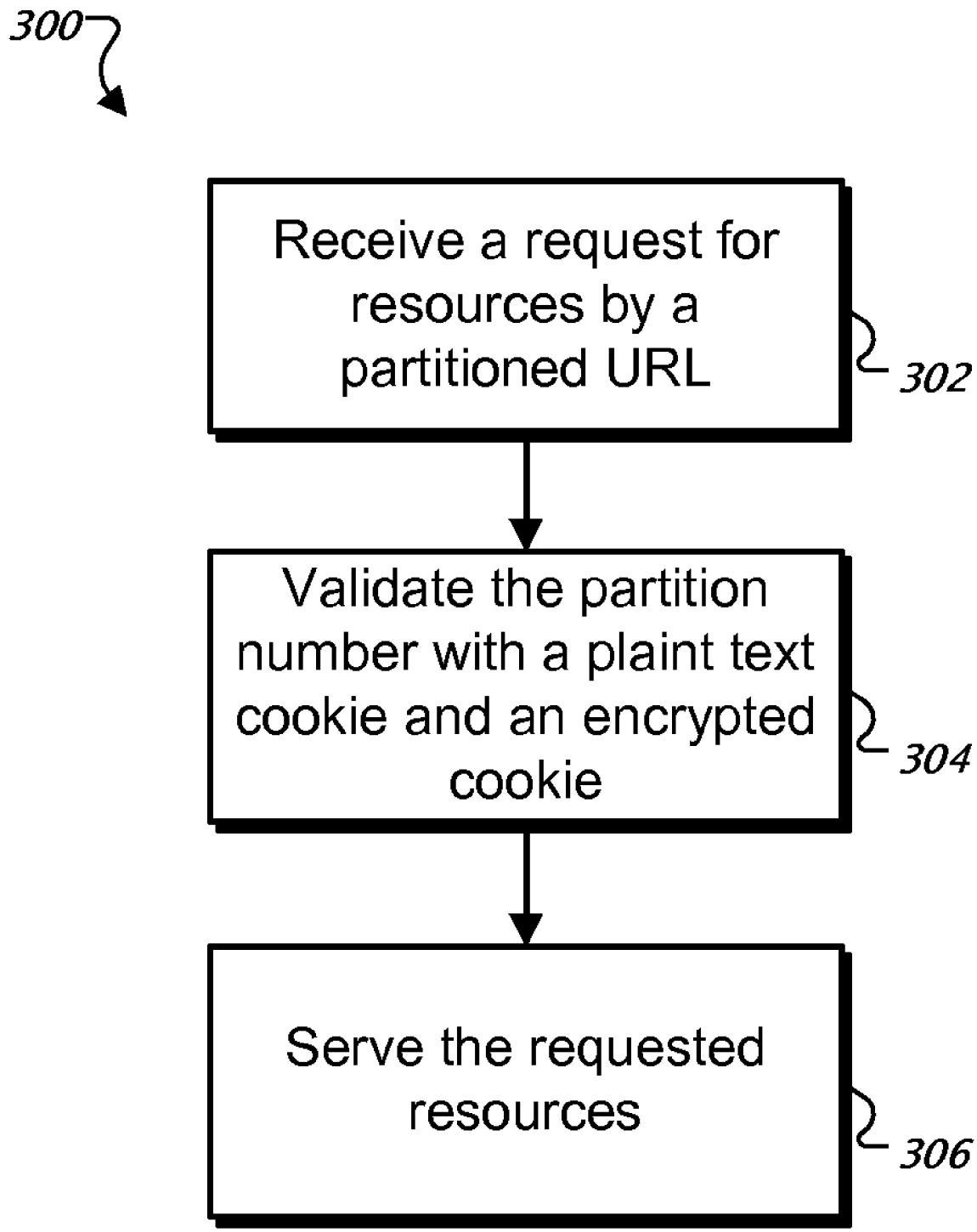
FIG. 3 is a flow diagram of an example process for serving resources to a client device having multiple logged on user accounts.

FIG. 3 is a flow diagram of an example process 300 for serving resources to a client device having multiple logged on user accounts. In general, the process involves validating a partition number in a partitioned URL with a plain text cookie and an encrypted cookie.

In some implementations, the process 300 is performed by the same server that performs a logon process, e.g., the process 200 illustrated in FIG. 2. In some implementations, the process is performed by data server that is distinct from a verification server that performs a logon process. For purposes of illustration, the process 300 will be described with respect to a server that performs the process 300.

The server receives a request for one or more resources associated with a user account having a user identification (step 302). The resources are identified by a partitioned URL. In some cases, the client device is redirected to a partitioned URL, for instance, at the end of a logon process (e.g., the process 200 illustrated in FIG. 2). In some cases, the client device forms the partitioned URL using a partition number in a plain text cookie.

The server validates the partition number in the partitioned URL with a plain text cookie and an encrypted cookie on the client device (step 304). The server uses the partition number in the URL to determine a user identification in the plain text cookie. In some implementations, the server uses the user identification in the plain text cookie to determine an index to the encrypted cookie. The server determines that the user identification matches a user identification in the encrypted cookie.

The system serves the requested resources (step 306). The client device stores the resources in a cache on the client device (e.g., caches 124 and 126 of FIG. 1). The cache is associated with the user identification.

An example of a resource is JavaScript code that a web browser on the client device can execute to run an application on the client device. In some implementations, the resource is executable code that has the user identification embedded in it. A web browser or other application that executes the code can compare the embedded user identification with the user identification in the plain text cookie before executing the code.

Figure 4:
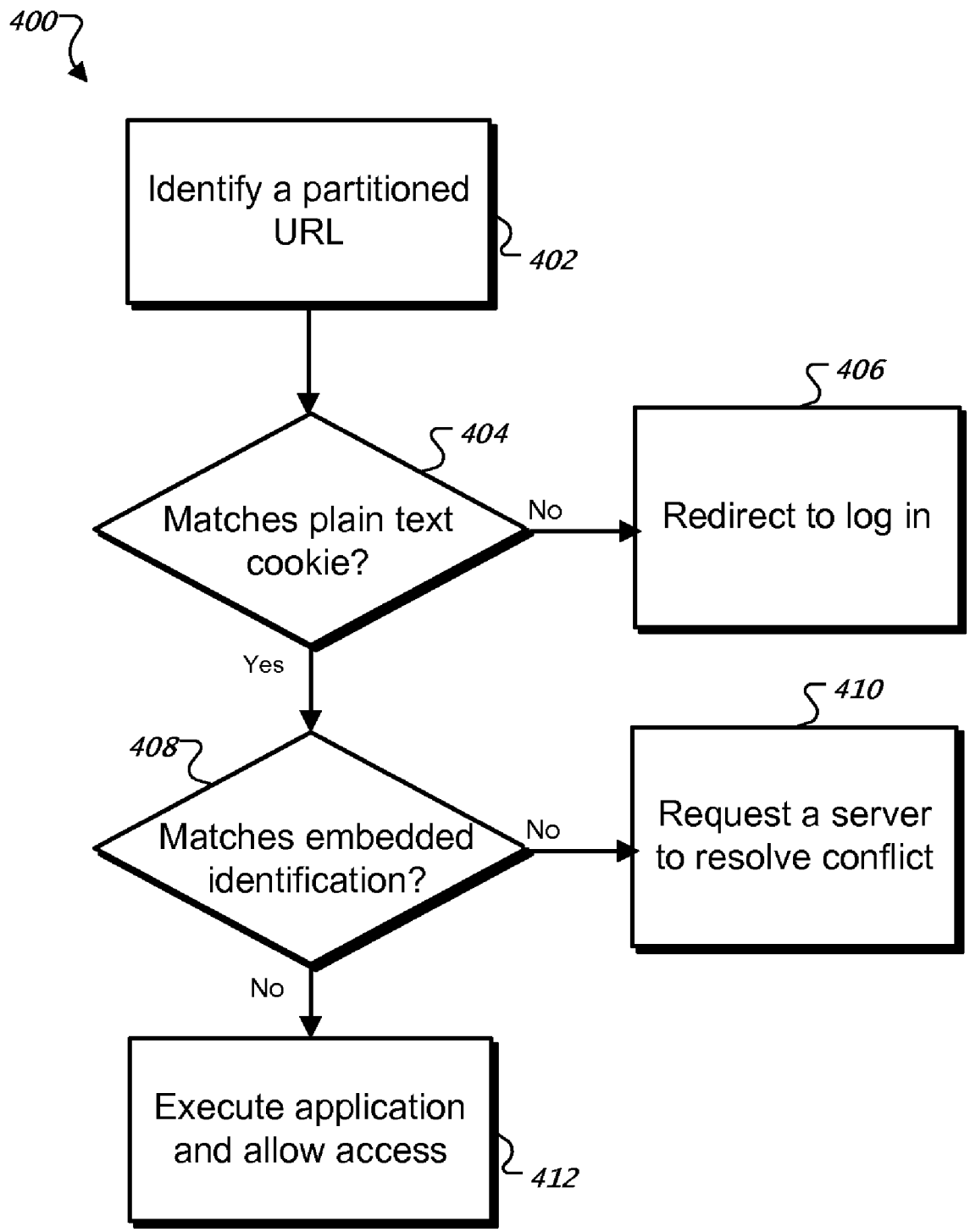
FIG. 4 is a flow diagram of an example process for executing a cached application for a particular user account.

FIG. 4 is a flow diagram of an example process 400 for executing a cached application for a particular user account. In general, the method involves determining whether a partition number in a URL matches a plain text cookie on a client device. In some implementations, the process 400 is performed by a system, e.g., the client device 112 of FIG. 1. For purposes of illustration, the process 400 will be described with respect to a client device that performs the process 400.

The client device identifies a partitioned URL for the application code (step 402). For example, a user selects a bookmark for a user account in a web browser on the client device. The bookmark includes the partitioned URL.

The client device determines whether the partition in the partitioned URL matches a user identification in a plain text cookie on the client device (step 404). If the partition has no match in the plain text cookie, the client device redirects the client device to a log in process (step 406). Typically, the client device loads a web page that a user can use to log in.

In some implementations, the user identification for the particular user account is embedded in the cached application. The client device determines whether the embedded user identification matches the user identification in the plain text cookie corresponding to the partition in the partitioned URL (step 408). If the embedded user identification does not match, the client device sends a request to a server (e.g., server 114) to resolve the conflict (step 410). For example, the server assigns a new partition number to user account. In another example, the server redirects the client device to a log in process.

The client device executes the cached application and allows access to resources in a cache for the particular user (step 412). By this method, a cached application for a user identification can be executed without requiring a mobile device to communicate on a network.

FIGS. 5A and 5B show a table illustrating a series of example interactions between a user with multiple accounts on a client device and a server. The first column 502 shows user actions. The second column 504 shows the states of an encrypted cookie (labeled "SID") and a plain text cookie (labeled "MID") on the client device. The third column 506 shows server actions. The fourth column 508 shows client device actions. Each row in the table represents a time in the series of example interactions.

At the time represented by row 510, the user navigates to a canonical application URL. The application URL refers to the server. Both the plain text cookie and the encrypted cookie are empty. The server receives the request for the application referred to by the URL, determines that URL does not include a partition number, and redirects the client device to a log on process. The client device, user, and server interact to log on the user (e.g., the user enters a user identification and password into the client device which sends the user identification and password to the server). The server redirects the client device to the canonical application URL and updates the encrypted cookie to include the user identification for the logged on account ("user1@b.com").

At the time illustrated by row 512, the encrypted cookie reflects the logged in user account, but the URL does not. The server assigns a partition number to the account if needed and redirects the client device to a URL including the partition. In the example shown, the assigned partition is the number 67. The server updates the plain text cookie on the client device with the user identification, the partition, and an index into the encrypted cookie (in the example shown, the index is 0).

At the time illustrated by row 514, the server verifies the partition in the URL with the plain text cookie and the encrypted cookie. The server serves application resources for the application (e.g., JavaScript code with the user identification "user1" embedded in the code). The client device stores the application resources in a cache for the account associated with the user identification "user1." The client device executes the application.

At the time illustrated by row 516, the client device accesses a cache associated with "user1." The client device allows access to the cache because the partition in the plain text cookie matches the partition in the URL (and optionally the user identification embedded in the resource).

At the time illustrated by row 518, the user bookmarks the current URL. The current URL includes the partition. The user typically uses a web browser on the client device to create the bookmark.

At the time illustrated by row 520, the user invokes a user interface (e.g., a web page from the server) to log in as another user. The log on process is repeated for a new user account with the user identification "user2" and the server updates the encrypted and plain text cookies. The server redirects the client device to a partitioned URL for the newly logged in user.

At the time illustrated by row 522, the encrypted cookie and the plain text cookie both include entries for user1 and user2. Using the partitioned URL for the newly logged in user, the client device will allow access to a cache of resources for user2. The partition in the URL matches the a user identification in the plain text cookie. In some implementations, the user identification in the plain text cookie matches a user identification embedded in an application resource.

At the time illustrated by row 524, the user accesses the bookmarked URL. The URL includes the partition for user1. The partition in the URL matches the user identification for user1 in the plain text cookie, so the client device allows access to the cache for user1.

At the time illustrated by row 526, the user logs out. In some implementations, logging out clears all entries from both the encrypted cookie and the plain text cookie. For example, as shown in FIG. 5B, both the encrypted cookie and the plain text cookie have no entries. In some other implementations, logging out clears the entries in the cookies for only the active user account. For example, logging out could have cleared the entries for user1 from the plain text cookie and the encrypted cookie, because resources for user1 were most recently accessed.

At the time illustrated by row 528, the user access the bookmarked URL. The URL includes the partition for user1. Unlike the time illustrated by row 524, the partition in the URL no longer matches the plain text cookie. The user is redirected to login with the server. The server updates both the plain text cookie and the encrypted cookie.

At the time illustrated by row 530, the plain text cookie and the encrypted cookie include entries for user1. The plain text cookie includes the partition for user1. The partition matches the partition from the bookmarked URL so the client device allows access to the cache for user1.

At the time illustrated by row 532, the user logs out and logs in as user3 in a different setting, e.g., a different application, web browser, or browser page. The server updates both the encrypted cookie and the plain text cookie with entries for user3. If the user attempts to access the cache for user1 from the different setting, the user will be redirected to log in. The URL for the cache for user1 will not include a partition that matches an entry in the plain text cookie or the encrypted cookie.

Thus various methods have been described for maintaining multiple user accounts on a client device for an online service provider. In some implementations, a web browser on a mobile device supports protection of the loading of application resources from an application cache (e.g., caches 124 and 126) by requiring a specific cookie to have a specific value. In those implementations, encrypted and plain text cookies can still be maintained advantageously. A separate cookie can be set on each path partition corresponding to a user account, and each application cache can store corresponding application resources. Application resources served from a particular path partition can then be protected by requiring a cookie to have a value corresponding to a path partition number. Thus the web browser will not load application resources if the plain text cookie corresponding to a partition is not set. Instead, the browser will redirect a user to a log-in page.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   storing on a client computing device a first cookie containing plaintext representations of one or more user identifications, and a second cookie containing encrypted versions of the one or more user identifications;
   updating the cookies in coordination with each other based on communications received from a central server system in response to actions by a user of the client computing device to log on or off of accounts managed by the computer server system; and mediating user access to data stored locally on the client computing device by using the first and second cookies and determining whether the data is associated with one of the user identifiers.

2. The method of claim 1, further comprising:
selecting an identifier for a first user identification from a plurality of possible identifiers;
updating the first cookie with the identifier for the first user identification; and
redirecting the client computing device to a resource locator including the identifier.

3. The method of claim 1, further comprising:
identifying a previously determined identifier for a first user identification, where the previously determined identifier was selected from a plurality of possible identifiers;
determining that the previously determined identifier matches another identifier of the one or more user identifiers; and
selecting a new identifier for the first user identification from the possible identifiers, where the new identifier does not match any identifier of the one or more user identifications.

4. The method of claim 1, further comprising:
receiving a logout for a first user identification; and
updating the first and second cookies to remove the user identification.

5. The method of claim 1, wherein the data is application code, and wherein a first user identification is embedded in the application code.

6. The method of claim 1, further comprising:
maintaining an index in the first cookie that specifies a mapping between user identifications in the first cookie and user identifications in the second cookie.

7. The method of claim 1, further comprising:
providing the data to the client computing device, including validating an identifier for a first user identification, wherein the identifier is included with a resource locator for the data, and wherein validating includes using the identifier and the first cookie to identify the first user identification in the encrypted cookie.

8. A system, comprising:
one or more processors configured to interact with a computer storage medium in order to perform operations comprising:
storing on a client computing device a first cookie containing plaintext representations of one or more user identifications, and a second cookie containing encrypted versions of the one or more user identifications;
updating the cookies in coordination with each other based on communications received from a central server system in response to actions by a user of the client computing device to log on or off of accounts managed by the computer server system; and
mediating user access to data stored locally on the client computing device by using the first and second cookies and determining whether the data is associated with one of the user identifiers.

9. The system of claim 8, the operations further comprising:
selecting an identifier for a first user identification from a plurality of possible identifiers;
updating the first cookie with the identifier for the first user identification; and
redirecting the client computing device to a resource locator including the identifier.

10. The system of claim 8, the operations further comprising:
identifying a previously determined identifier for a first user identification, where the previously determined identifier was selected from a plurality of possible identifiers;
determining that the previously determined identifier matches another identifier of the one or more user identifiers; and
selecting a new identifier for the first user identification from the possible identifiers, where the new identifier does not match any identifier of the one or more user identifications.

11. The system of claim 8, the operations further comprising:
receiving a logout for a first user identification; and
updating the first and second cookies to remove the user identification.

12. The system of claim 8, wherein the data is application code, and wherein a first user identification is embedded in the application code.

13. The system of claim 8, the operations further comprising:
maintaining an index in the first cookie that specifies a mapping between user identifications in the first cookie and user identifications in the second cookie.

14. The system of claim 8, the operations further comprising:
providing the data to the client computing device, including validating an identifier for a first user identification, wherein the identifier is included with a resource locator for the data, and wherein validating includes using the identifier and the first cookie to identify the first user identification in the encrypted cookie.

15. The system of claim 8, further comprising the central server system.

16. The system of claim 8, further comprising the client computing device.

17. The system of claim 8, further comprising the central server system and the client computing device.

18. A non-transitory computer storage medium encoded with a computer program, the program comprising instructions that when executed by data processing apparatus cause the data processing apparatus to perform operations comprising:
storing on a client computing device a first cookie containing plaintext representations of one or more user identifications, and a second cookie containing encrypted versions of the one or more user identifications;
updating the cookies in coordination with each other based on communications received from a central server system in response to actions by a user of the client computing device to log on or off of accounts managed by the computer server system; and
mediating user access to data stored locally on the client computing device by using the first and second cookies and determining whether the data is associated with one of the user identifiers.

* * * * *